US005635148A

United States Patent [19]
Shadman

[11] Patent Number: 5,635,148
[45] Date of Patent: Jun. 3, 1997

[54] REACTIVE MEMBRANE FOR FILTRATION AND PURIFICATION OF GASES OF IMPURITIES AND METHOD UTILIZING THE SAME

[75] Inventor: Farhang F. Shadman, Tucson, Ariz.

[73] Assignee: Arizona Board of Regents on Behalf of the University of Arizona, Tucson, Ariz.

[21] Appl. No.: 487,148

[22] Filed: Jun. 7, 1995

Related U.S. Application Data

[62] Division of Ser. No. 373,789, Jan. 17, 1995, abandoned, which is a division of Ser. No. 97,050, Jul. 27, 1993, abandoned, which is a continuation-in-part of Ser. No. 34,248, Mar. 22, 1993, abandoned, which is a continuation of Ser. No. 710,719, Jun. 6, 1991, Pat. No. 5,196,380.

[51] Int. Cl.$^6$ ................ C01B 13/00; C01B 31/18; C01B 31/20
[52] U.S. Cl. ................ 423/210; 423/219; 423/230; 423/236; 423/240 S; 423/245.1; 423/246
[58] Field of Search ................ 423/210, 219, 423/488, 246, 230, 245.1, 236, 240 S

[56] References Cited

U.S. PATENT DOCUMENTS

| | | | |
|---|---|---|---|
| 3,145,079 | 8/1964 | Harbaugh | 423/488 |
| 3,288,615 | 11/1966 | Estes et al. | 106/40 |
| 4,177,142 | 12/1979 | Halbfoster | 210/75 |
| 4,242,226 | 12/1980 | Siren | 252/422 |
| 4,344,775 | 8/1982 | Klein | 55/75 |
| 4,680,221 | 7/1987 | Murayama et al. | 428/246 |
| 4,685,940 | 8/1987 | Soffer et al. | 55/158 |
| 4,713,224 | 12/1987 | Tamhankar et al. | 423/219 |
| 4,782,226 | 11/1988 | Jeffries, Jr. et al. | 250/227 |
| 4,789,386 | 12/1988 | Vaughn et al. | 55/16 |
| 4,853,148 | 8/1989 | Tom et al. | 423/488 |
| 4,855,276 | 8/1989 | Osborne et al. | 502/415 |
| 4,867,960 | 9/1989 | Tom | 423/488 |
| 4,916,105 | 4/1990 | Rieck et al. | 502/303 |
| 4,921,823 | 5/1990 | Furneaux et al. | 502/4 |
| 4,938,785 | 7/1990 | MacPherson et al. | 55/1 |
| 4,946,592 | 8/1990 | Galaj et al. | 210/490 |
| 5,037,791 | 8/1991 | Comolli et al. | 502/433 |
| 5,196,380 | 3/1993 | Shadman | 502/4 |
| 5,204,075 | 4/1993 | Jain et al. | 423/219 |
| 5,262,198 | 11/1993 | Wu et al. | 427/249 |

FOREIGN PATENT DOCUMENTS

| | | | |
|---|---|---|---|
| 508145 | 12/1954 | Canada . | |
| 2251351 | 7/1975 | France . | |
| 745439 | 5/1943 | Germany | 423/219 |
| 2906510 | 8/1979 | Germany . | |
| 6440 | 3/1975 | Japan | 423/219 |
| 52-8794 | 3/1977 | Japan . | |
| 52-33170 | 3/1977 | Japan . | |
| 53-114571 | 10/1978 | Japan . | |
| 55-20667 | 2/1980 | Japan . | |
| 59-102419 | 6/1984 | Japan . | |
| 12315 | 1/1991 | Japan | 423/219 |
| 284808 | 2/1928 | United Kingdom | 423/219 |
| 944207 | 12/1963 | United Kingdom | 423/219 |
| 1246483 | 9/1971 | United Kingdom | 423/219 |
| 2201355 | 9/1988 | United Kingdom . | |

OTHER PUBLICATIONS

Leenaars, A.F.M., et al., "The Preparation . . . with Ultra–Fine Pores", Journal of Materials Science, No. 19, 1984, pp. 1077–1088.

Leenaars, A.F.M., et al., "Porous Alumina Membranes", Chemtech, Sep. 1986, pp. 560–564.

*Primary Examiner*—Wayne Langel
*Attorney, Agent, or Firm*—Leydig, Voit & Mayer

[57] ABSTRACT

A reactive membrane for removing impurities, such as water, oxygen and organic compounds, from a gas is provided. The reactive membrane includes a porous inorganic substrate having exposed surfaces and at least one carbon layer, which is modified to present active sites, deposited on the exposed surfaces. The active sites include metal species which are at least partially deoxygenated and are chemically bonded to the carbon layer. Methods of forming the reactive membrane and of removing impurities from a gas with the membrane are also provided.

58 Claims, No Drawings

REACTIVE MEMBRANE FOR FILTRATION AND PURIFICATION OF GASES OF IMPURITIES AND METHOD UTILIZING THE SAME

This disclosure is a divisional patent application of prior patent application Ser. No. 08/373,789, filed Jan. 17, 1995, abandoned which is a divisional patent application of prior patent application Ser. No. 08/097,050, filed on Jul. 27, 1993 abandoned; which is a continuation-in-part patent application of prior patent application Ser. No. 08/034,248, filed on Mar. 22, 1993, now abandoned; which is a continuation patent application of prior patent application Ser. No. 07/710,719, filed on Jun. 6, 1991, now U.S. Pat. No. 5,196,380.

FIELD OF THE INVENTION

This invention relates to a membrane, and more particularly to a membrane and a method of filtering and purifying gases of impurities.

BACKGROUND OF THE INVENTION

In order to manufacture advanced materials such as semiconductor devices, trace impurities on the parts per million (ppm) to parts per billion level (ppb) and even sub-ppb levels in any of the manufacturing constituents must be substantially avoided. For example, in manufacturing semiconductor devices, impurities (e.g., moisture, oxygen and organic compounds) in process gases adsorb on the semiconductor wafer, degrade its performance, and lower the manufacturing yield and device reliability. There are generally two types of impurities in process gases: heterogeneous (e.g., particles and macromolecules) and homogeneous (e.g., dissolved particles). Typically, heterogeneous impurities are removed by filtration and homogeneous impurities are removed by purification. There has been particular interest in the removal of homogeneous impurities from process gases.

There are various commercial purification techniques and purifiers which work by physical adsorption of impurities or by catalytic conversion of impurities to other forms which can be adsorbed. Another exemplary purification technique is a packed bed of particles of a getter material. Exemplary getter materials include various resins (e.g., Nanochem® resins) and various alloys (e.g., Zr-V-Fe alloys). For purification, the gas stream passes through these packed beds and the impurities react with the getter material. Although these packed beds filter on the ppm level, the packed beds often do not effectively filter trace homogeneous impurities on the ppb level. Moreover, these packed beds tend to be ineffective when there is an abrupt surge in the impurity level due to the inefficiency of the packed beds in bringing impurity molecules in contact with the resins or alloy. Additionally, these packed beds tend to generate heterogeneous impurities because of mechanical motion and attrition of particles of the getter material. These packed beds also are typically not reusable and often cannot be regenerated.

Additionally, the use of porous ceramics for filtration of particles are known. For example, U.K. Patent No. 2,021, 355 to Dahlquist et al proposes a porous membrane for separating heterogeneous impurities from an aqueous medium. The porous membrane comprises an outer support matrix having through-passages and an inner layer lining the through-passages and deposited on the outer support. The support matrix can be a polymer, metal or ceramic. The inner layer can be a matrix of particles of aluminum hydroxide, partially hydrated aluminum oxide, silicon dioxide or zirconium dioxide. French Patent No. 2,251,351 proposes a microporous ceramic filter comprising a microporous ceramic support electrophorethically coated with an oxide of Al, Si, Mg, Ti, Cr, Ni, Zr or Fe. U.S. Pat. No. 3,288,615 to Estes et al. proposes a ceramic filter body comprising a framework of one or more tectosilicates with a mineral species (e.g., aluminates and oxides) distributed throughout and filing the framework.

SUMMARY OF THE INVENTION

It is therefore an object of the present invention to provide a reactive membrane and a method utilizing the same.

It is another object of the invention to provide a reactive membrane and method for filtering and purifying gases to remove heterogeneous and homogeneous impurities, such as unwanted gases, moisture, organic compounds and metallic compounds.

It is yet another object of the invention to provide a reactive membrane and method for filtering and purifying gases of ppm to ppb levels of heterogeneous and homogeneous impurities.

It is still another object of the invention to provide a reactive membrane which can be reused by regenerating the membrane.

These and other objects are provided according to the present invention by a reactive membrane comprising an inorganic substrate layer having a plurality of pores therein (i.e., a porous inorganic substrate), at least one layer of carbon deposited on the substrate layer and coating the pores thereof, and at least one reactive layer of a metal in reduced form (i.e., a partially or substantially deoxygenated metal species), which is chemically bonded to the carbon layer and is capable of reacting with impurities in a gas. The present reactive membrane is unlike existing filtration and purification membranes in that in addition to the typical filtration of heterogeneous impurities (e.g., particles and macromolecules), the reactive layer of the membrane is capable of interacting with and removing trace impurities (i.e., ppb or sub-ppb levels of homogeneous impurities such as unwanted gases, moisture and organic compounds).

The present reactive membrane may be formed by first depositing at least one layer of carbon on the porous substrate to coat the plurality of pores thereof, preferably using a chemical vapor deposition (CVD) technique. Preferably, the carbon layers cover substantially the entire surface area of the porous substrate, i.e., a layer of carbon is deposited on substantially all of the exposed surfaces of the porous substrate. For the purposes of this invention, the exposed surfaces are defined to be those surfaces, including the exterior faces of the porous substrate and the surfaces within the pores of the substrate, which may come into contact with a gas passing through the porous substrate. At least one reactive layer of a metal in reduced form is then chemically bonded to the carbon layer.

The reactive layer may be formed by depositing a precursor metal species on the carbon layer. The precursor metal species may include the metal in an oxidized form and/or in a deoxygenated form. The membrane is then heated to chemically bond the metal in reduced form (i.e., having none or less than a stoichiometric amount of oxygen), to the carbon layer. In other words, the carbon layer is modified to present active sites, and the active sites include metal species which are at least partially deoxygenated and, preferably, substantially deoxygenated.

As is apparent from the description above, the present reactive membrane comprises a porous inorganic substrate, at least one carbon layer deposited on substantially all of the exposed surfaces of the porous substrate and at least one reactive layer of a metal in reduced form chemically bonded to the carbon layer.

The present invention also provides a method for forming a reactive membrane for removing homogeneous and heterogeneous impurities from gases. The method includes depositing at least one layer of carbon on substantially all of the exposed surfaces of a porous inorganic substrate, depositing a precursor metal species on the carbon layer, and then heating the porous inorganic substrate to form active sites on the carbon layer. The active sites include at least partially deoxygenated metal species chemically bonded to the carbon layer.

In operation, a stream of the gas to be filtered and purified is passed through the membrane. Heterogeneous impurities are filtered primarily by the porous substrate layer, while trace homogeneous impurities are primarily removed by interacting with the reactive layer. In other words, the impurities interact with the active sites of the carbon layer, thereby scavenging and removing the impurities from the gas phase. After use, the membrane may be regenerated by reactivating the reactive layer. The regeneration may be carried out by heating the membrane to greater than about 300° C. under either an inert atmosphere or a reducing atmosphere, such as a hydrogen-containing atmosphere. The regenerated membrane may then be reused to remove impurities from a gas stream.

DESCRIPTION OF A PREFERRED EMBODIMENT

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

The present invention provides a reactive membrane for filtering and purifying gases of impurities. The reactive membrane includes a porous inorganic substrate having exposed surfaces, at least one layer of carbon deposited on substantially all of the exposed surfaces. The carbon layer is modified to present active sites, which include at least partially deoxygenated metal species (metal in reduced form) chemically bonded to the carbon layer. The metal in reduced form is capable of interacting and, preferably, reacting with the impurities, thereby scavenging and removing the impurities from the gas.

The substrate layer has a plurality of pores. The porous substrate may include a porous ceramic material, a porous metal (e.g., porous stainless steel) or other porous inorganic material such as porous carbon. Porous substrates which include a porous ceramic material preferably have an initial pore size of about 500Å. Porous substrates which include a porous metal typically have a larger initial pore size, e.g., on the order of 2 to 5 microns. The porous substrate is resistant to temperatures greater than about 300° C., and preferably temperatures greater than about 500° C., to permit the reactive membrane to be regenerated after use, i.e., after deactivation by interaction with impurities. Any of the commercially available porous membranes, such as those formed from ceramic materials having a porous structure and exposed surfaces (e.g., alumina, zirconia, titania) or porous metals (e.g., porous metal filters formed by sintering a metal powder or metal fibers) and the like are suitable for use in the subject invention as the porous substrate. An exemplary porous stainless steel substrate is a porous 316 L stainless steel substrate, which is formed from sintered stainless steel fibers and has a pore size of about 4 microns. Such stainless steel substrates are commercially available from Pall Corporation of East Hills, N.Y. An exemplary porous ceramic membrane is sold under the trademark Membralox® by Alcoa of Warrendale, Pa. Membralox® is an α-alumina membrane coated with a monolayer of γ-alumina and is available in variety of pore sizes. Exemplary configurations of the porous substrate may include a bundle of ceramic tubes in a shell or a wall flow monolithic geometry. The porous substrate alone is effective in removing heterogeneous impurities (i.e., particles and macromolecules) from the gas being filtered and purified.

The carbon layer is preferably deposited on substantially all of the exposed surfaces of the porous inorganic substrate. The thickness of the carbon layer deposited on porous substrates which include a porous ceramic material is preferably from about 20Å to about 100Å. Porous substrates which include a porous metal typically have thicker carbon layers deposited on their exposed surfaces. The deposited layer of carbon is in the form of a carbon film, which is tightly bound to the exposed surfaces (i.e., the carbon is not deposited as fluffy carbon or carbon filaments), to prevent carbon particulates from sluffing off the substrate surfaces and possibly clogging the pores of the membrane. If a porous ceramic substrate is used, the ceramic material preferably includes a metallic impurity, e.g., about 0.1 to about 1% of iron or nickel, to facilitate deposition of the carbon. Typically, the porous substrate is degassed prior to the deposition of the carbon layer to remove any preexisting impurities in the substrate. The carbon layer preferably is deposited over and coats substantially the entire surface area of the porous substrate (i.e., substantially all of the exposed surfaces of the porous substrate) and reduces the pore size of the substrate to from about 50Å to about 100Å.

An exemplary technique for depositing the carbon layer is a CVD technique via the disproportionation of carbon monoxide (CO) or the dissociation of other carbon sources such as various hydrocarbons. The deposition can occur under various reaction times and temperatures, and gas compositions, the control of which being within the skill of one in the art. For example, if CO is used as the carbon source, the disproportionation may be conducted at a temperature above about 250° C. using a gas mixture of about 5 to 15 percent by volume CO, 1 to 5 percent by volume hydrogen and the remainder a relatively inert gas such as nitrogen. Preferably, the disproportionation is carried out using a mixture of CO and hydrogen, which contains from about 6% to about 14% hydrogen (by volume), at a temperature of from about 350° C. to about 450° C. The thickness and amount of carbon deposited may be controlled by adjusting the reaction time, temperature, gas composition and gas flow rate. Carbon deposition is typically more uniform and efficient with metal substrates or with ceramic substrates which include metallic impurities. For example, good carbon deposition may be achieved at about 435° C. on a 1.1" diameter filter disk formed from sintered stainless steel fibers using an about 88/12 (vol/vol) mixture of CO and hydrogen at a total gas flow rate through the filter disk of about 500 cc/min.

The active sites include at least one metal species in reduced form chemically bonded to the carbon layer. The metal species is capable of reacting or otherwise interacting with the impurities of the gas stream. The term "in reduced form" relates to the oxidation state of the metal in that the oxygen is present in less than the stoichiometric amount in the metal oxide (i.e., the metal species is partially or substantially deoxygenated). The reduced form of the metal may consist of metal or metal suboxides chemisorbed on carbon as well as metal-carbon intercalate compounds. In other words, the carbon layer is modified to present active sites which include partially or substantially deoxygenated metal species chemically bonded to the carbon layer. Preferably, the active sites include substantially deoxygenated metal species, which are capable of reacting with trace impurities in a gas stream. Exemplary metals include manganese, magnesium, and alkali metals such as lithium, sodium and potassium.

The formation of the active sites may be carried out by first depositing a precursor metal species on the carbon layer. The precursor metal species may include an oxidized form of the metal and/or a deoxygenated form of the metal. The precursor metal species may be deposited by using a CVD technique, e.g., forming a vapor of the precursor metal species to be deposited and contacting the precursor metal species vapor with the layer of carbon deposited on the porous substrate layer. The vapor, for example, may be generated from the metal itself or from a hydroxide or oxide of the metal. The temperature for deposition depends on the specific porous substrate and precursor metal species and, typically, is greater than about 300° C.

Alternately, the precursor metal species may be deposited from a mixture which includes a solvent and the precursor metal species, e.g., a solution or slurry of the precursor metal species in the solvent. Solutions of metal-bearing compounds such as metal hydroxides or oxalates may be employed to impregnate the substrate with the metal precursor species. For example, if manganese is used, an aqueous solution of manganese oxalate is suitable for this purpose.

A preferred method of depositing the precursor metal species is to dissolve or slurry the precursor metal species in a non-aqueous solvent. Preferably, the non-aqueous solvent is a solvent which may be easily evaporated without leaving a residue, e.g., a solvent such as anhydrous liquid ammonia. Exemplary solutions of a precursor metal species in a non-aqueous solvent include solutions of an alkali metal, such as sodium, in anhydrous liquid ammonia. If metals, which are insoluble or only sparingly soluble in an non-aqueous solvent such as anhydrous liquid ammonia, are to be used as the precursor metal species, a slurry of a very fine powder of the metal may be suitable for depositing the metal on the carbon layer. The solution or slurry of the precursor metal species is passed through the carbon-coated porous substrate, thereby depositing the precursor metal species on the carbon layer. Nitrogen or another inert gas may be used to force the solution or slurry through the porous substrate or suction may be used to draw the solution or slurry through the porous substrate.

After passing the solution or slurry through the porous substrate to deposit the metal precursor species on the carbon layer, the non-aqueous solvent may be driven off by purging with an inert gas such as nitrogen. Gradual heating to about 110° C. and, preferably 200° C. or greater, may facilitate the purging process.

The substrate bearing the deposited precursor metal species is then heated to form metal species chemically bonded to the carbon layer, i.e., to form active sites on the carbon layer. The term "chemically bonded" is intended to include ionic and covalent bonds and van der Waals forces. In other words, "chemically bonded" includes absorbed metal and metal suboxides on carbon as well as various metal-carbon groups and intercalate compounds. Typically, the chemically bonding is accomplished by heating the substrate to greater than about 300° C., preferably about 380° C. to about 400° C., and most preferably about 500° C. thereby forming the active sites on the carbon layer. The formation of the active sites may be carried out by heating the substrate in an inert atmosphere such as nitrogen, argon, helium, and the like. If the active sites include lithium, potassium or magnesium species, argon or helium is preferably used to provide the inert atmosphere. The presence of the inert atmosphere lessens the opportunity for impurities and, in particular, oxidizing impurities, in the atmosphere to come into contact with the membrane being activated. If impurities are present in the gas in contact with the membrane during the activation process, the impurities may interact with and consume active sites. The loss of active sites may adversely affect the impurity removal capabilities of the reactive membrane. Preferably, the activation process is carried out under ultra pure inert gas to avoid the deactivation of active sites due to trace impurities in the inert gas. The inert gas may also include a reducing gas, e.g., hydrogen, to facilitate active site formation. Preferably, the inert gas employed during the activation process includes at least about 1 percent, more preferably from about 2 to about 35 percent, most preferably from about 4 to about 10 percent hydrogen. In another embodiment, the activation process may be carried out by heating the substrate to greater than about 300° C. under vacuum.

Typically, the substrate is heated to greater than about 500° C. and maintained at that temperature for a suitable amount of time to form the active sites (e.g., about one hour) while being purged with a mixture of a inert gas preferably having at least about 4 percent hydrogen. This activates the active sites of the carbon layer by reacting the precursor metal species with the carbon to form active sites on the substrate, i.e., to form metal species chemically bonded to the carbon layer. The metal active sites may exist in the reduced form (C—M), as an adsorbed metal, as a metal suboxide, or in oxidized form ($CO_2M$), with the removal of the oxygen necessary to have the preferred highly reactive reduced form. Stated otherwise, the metal in reduced form has no, or less than a stoichiometric amount of oxygen, i.e., the metal species is partially or substantially deoxygenated. Preferably, the metal species is substantially deoxygenated. The chemical bond anchors the reactive metal species to the carbon and the carbon is anchored to the porous substrate. Thus, because the metal species and carbon are anchored, contamination of the gas stream during filtration/purification is avoided.

In another embodiment, several different metals can be deposited sequentially or as a mixture onto the carbon layer to permit removal of selective impurities as the gas passes through each of the layers of the filter membrane. In still another embodiment, the reactive membrane may include two or more layers of carbon deposited on the exposed surfaces. Each carbon layer may be individually modified to present activate sites. Such membranes may be produced by sequentially depositing a carbon layer, depositing a precursor metal species on the carbon layer and then heating the membrane to form the active sites on the carbon layer. This sequence may be repeated until the desired number of activated carbon layers has been produced. Reactive membranes, which include at least two carbon layers with each layer presenting active sites, have a number of advantages. Such multi-carbon layer membranes have a very high impurity removal capacity. The active sites on the carbon layers may include more than one metal species. For example, a reactive membrane may include first and second carbon layers deposited on substantially all of the exposed surfaces of the porous inorganic substrate. The first carbon layer may be modified to present active sites which include at least partially deoxygenated first metal species chemically bonded to the first carbon layer and the second carbon layer may be modified to present active sites which include at least partially deoxygenated second metal species chemically bonded to the second carbon layer. This may permit the use of two metals which require different deposition methods (e.g., one via CVD and the other via non-aqueous solution deposition).

The present reactive membranes are highly effective for removing a variety of impurities from a gas. For example, a reactive membrane embodying the present invention may be used to remove an impurity, such as oxygen ($O_2$), water ($H_2O$), carbon monoxide (CO), carbon dioxide ($CO_2$) or methane ($CH_4$), from a gas stream, e.g., a stream of an inert gas such as nitrogen or argon. By passing the gas including the impurities through the reactive membrane and interacting the impurities with the active sites, the concentration of the impurity in the gas may be reduced to no more than about 100 ppb, preferably to no more than about 1 ppb. By employing a reactive membrane embodying the present invention, the concentration of water or carbon monoxide in an inert gas may be reduced to no more than about 0.7 ppb. A reactive membrane embodying the present invention may be employed to reduce the concentration of methane in an inert gas to no more than about 0.2 ppb. A reactive membrane embodying the present invention may also be employed to reduce the concentration of oxygen or carbon dioxide in an inert gas to no more than about 0.1 ppb.

The reactive membranes of this invention may find use in a variety of applications. For example, the reactive membranes may be employed in the removal of trace gas contaminants such as $O_2$, $CO_2$, $H_2O$, CO and $CH_4$ at the point of use in electronic manufacturing processes. They also may find use in the removal of gaseous and particulate contaminants in gas or liquid source streams used in electronics manufacture, e.g., the removal of metal oxides that may be formed in tubing. Additionally, the reactive membranes embodying this invention may find use in the treatment of exhaust gas streams from various processes, e.g., in the removal of small amounts of cyanides, silanes, arsenic, mercury and the like, including poisonous particulates which may be present in gaseous exhaust streams from processes used in electronics manufacturing.

The reactive membranes are also extremely effective for the purification of inert gases, even at temperatures as low as room temperature. For example, the reactive membranes of the present invention may be used to remove impurities, such as oxygen, moisture, carbon dioxide and hydrocarbons, from inert gases. The present invention permits the achievement of levels of purification that are significantly better than those which may be realized with the best commercial purification systems.

The present reactive membranes may also be used to remove moisture from streams of reactive gases such as oxygen, silanes, hydrogen chloride (HCl) and hydrogen bromide (HBr). Typically, reactive membranes having active sites which include sodium or magnesium species chemically bonded to the carbon layer may be employed for this purpose. Even though the reactive gas may react with the active sites, moisture may still be chemisorbed by the reactive membrane (i.e., the water interacts with the active sites, thereby substantially removing the water from the reactive gas). For example, although HCl or HBr may react with an active site (e.g., active sites which include magnesium species) to form a metal halide, moisture may still be chemisorbed by the metal halide to form a hydrate. Similarly, oxygen may react with the metal species of the active sites to form an oxidized site. Since the oxidized sites are capable of interacting with moisture, the reactive membranes of the present invention may be employed to remove trace levels of moisture from a reactive gas like oxygen. Reactive membranes embodying the present invention may also be used to remove oxygen from silanes.

In operation, a gas stream including impurities is passed through the reactive membrane, which may have any one of a variety of known configurations. It is recognized that a liquid stream could also be filtered/purified by altering the membrane in a manner known to those skilled in the art. Heterogeneous particles are removed from the gas stream by well known filter mechanisms. The active sites of the membrane interact, and preferably react, with trace homogeneous impurities present in the gas stream (e.g. oxygen, metallic compounds and the like, moisture or organic compounds) thereby removing the homogeneous impurities from the gas stream. Although applicant does not wish to be bound by any theory, it is thought that substantially all of the impurity molecules come in contact with the metal molecules of the reactive layer, interact, and are removed by the membrane from the gas being filtered and purified. In other words, the impurities interact with the metal species which are bonded to the active sites of the carbon layer, thereby scavenging and removing the impurities from the gas phase.

Once purification is complete and all of the reduced metal is oxidized or otherwise deactivated, the membrane may be regenerated by heating the substrate to greater than about 300° C. in an inert atmosphere (e.g., nitrogen or argon) to reduce the oxidized metal (i.e., regenerate the active sites). Alternatively, the regeneration may be carried out by heating the deactivated reactive membrane to greater than about 300° C. under a hydrogen-containing atmosphere. The regeneration capability of the reactive membrane, a process which may be carried many times, provides a significant advantage over known filtration/purification materials which typically may be used only once and for which there are apparently no known means of regeneration.

The membrane is typically regenerated after use by heating the membrane to at least about 300° C., preferably to greater than about 450° C., most preferably to a temperature of about 450° C. to about 550° C., in an inert atmosphere (e.g., nitrogen, argon, helium and the like). The carbon layer may participate in regeneration of the active sites in that, on heating in an inert atmosphere, the carbon may function as a reducing agent. The regeneration process is typically carried out for a time period of about 24 to 28 hours, although longer time periods, e.g., about 48 hours, may also be employed.

Alternatively, the membrane may be regenerated after use by heating the membrane to greater than about 300° C., and preferably to a temperature of about 450° C. to about 550° C., in the presence of a reducing atmosphere, such as a hydrogen-containing atmosphere. For example, the membrane may be regenerated by heating to greater than about 500° C. and maintaining the membrane at that temperature for about one hour while it is purged with a mixture of hydrogen and an inert gas. Preferably, the regeneration process is carried out using an atmosphere of an inert gas having from about 2 percent to about 100 percent hydrogen (vol:vol), more preferably from about 10 percent to about 40 percent hydrogen. Typically, the regeneration of the reactive membrane is carried out for a time period of from about 8 to about 28 hours under these conditions. As with the activation process used to originally form the active sites, the regeneration may also be carried out under an inert gas containing a lesser amount of hydrogen. With lower concentrations of hydrogen, longer times and/or higher temperatures are typically employed for the regeneration process. For example, the regeneration of a stainless steel reactive membrane may be carried out by heating the membrane for 12 to 24 hours at about 500° C. while purging with a 35:65 (vol:vol) mixture of hydrogen and nitrogen.

The filtration of heterogeneous impurities and the purification of homogeneous impurities may occur substantially simultaneously, i.e., with the heterogeneous impurities being trapped by the pores of the substrate and the homogeneous impurities interacting with the active sites of the carbon layer deposited on the substrate. Alternatively, the two different types of impurities may be removed by different regions of the reactive membrane. For example, the reactive membrane may include a separate porous region, e.g., an upstream layer of porous medium, which functions to substantially filter the heterogeneous impurities from the gas. In another embodiment of the invention, a separate porous medium, (e.g., a ceramic filter) which is placed upstream of the reactive membrane may be used to remove substantially all of the heterogeneous impurities from the gas stream.

The present invention is further illustrated by the following examples.

EXAMPLE 1

Lithium Species on Carbon-Coated Porous Alumina

A Membralox® α-alumina coated with a monolayer of γ-alumina ceramic substrate available from Alcoa and having a pore size of about 500Å is degassed at about 400° C. under a nitrogen atmosphere to remove any impurities in the substrate. Several monolayers of carbon are deposited on the ceramic substrate by the disproportionation of carbon monoxide using a gas mixture of 10 percent by volume CO, 2% percent by volume $CO_2$ and 88 percent by volume $N_2$. The layers of carbon substantially entirely cover the surface area of the ceramic substrate to reduce the pore size thereof to about 50Å. Lithium hydroxide is vaporized at a temperature of about 300° C. and the lithium gas is passed through the carbon coated ceramic substrate. This deposits (via CVD) a uniform layer of lithium metal in the oxidized form. An active group is formed between the carbon and lithium by heating the ceramic substrate layer in nitrogen gas to about 380° C. to about 400° C. After heating, the lithium exists primarily in the C-Li form, i.e., as a substantially deoxygenated lithium species, which is highly reactive with many impurities.

EXAMPLE 2

Potassium Species on Carbon-Coated Porous Alumina

The steps of Example 1 are repeated except potassium hydroxide is used in place of lithium hydroxide.

EXAMPLE 3

Manganese Species on Carbon-Coated Porous Alumina

The Membralox® substrate is used and prepared the same as in Example 1 except that the deposition of the active metal on the carbon-coated ceramic membrane is accomplished by solution impregnation instead of CVD. This involves passing a dilute solution of manganese oxalate through the membrane. The membrane is then dried by purging it with nitrogen at about 110° C. for about 10 hours. A layer of metal compound is thus deposited on the carbon coated membrane. The activation of the sites and production of the reduced metal sites follow the same procedure as that of Example 1.

EXAMPLE 4

Lithium Species on Carbon-Coated Porous Alumina

A ceramic substrate (α-alumina coated with a monolayer of γ-alumina which includes about 0.5% iron) having a pore size of about 500Å is degassed under a nitrogen atmosphere to remove any impurities using the procedure described in Example 1. A carbon film layer is deposited on substantially all of the exposed surfaces of the substrate using the following procedure. The alumina substrate is heated to about 440° C. for about fifteen hours while passing an 85:15 (vol:vol) mixture of CO and hydrogen through the substrate at a total flow rate of about 500 cc/min. The carbon-coated alumina membrane is then allowed to cool to room temperature. The carbon layer which is formed covers substantially all of the exposed surfaces of the substrate and reduces the pore size of the substrate to about 100Å.

The deposition of the precursor metal species on the carbon-coated alumina membrane is accomplished by solution impregnation using an aqueous solution of lithium hydroxide (6.25 g LiOH/100 ml $H_2O$). The aqueous lithium hydroxide is forced through the carbon-coated membrane using a positive pressure of nitrogen gas. Water is then removed by heating the membrane to 130° C. overnight while purging with dry ultrapure argon gas. The activation of the membrane to generate active sites which include lithium metal species in substantially deoxygenated form is accomplished by heating the impregnated membrane for about 24 hours to from about 460° C. to about 475° C. while continuing to purge the membrane with dry ultrapure argon gas.

EXAMPLE 5

Sodium Species on Carbon-Coated Porous Stainless Steel

A porous stainless steel disk (1.1" diameter, 0.25" thick; formed by sintering about 2 micron 316 L stainless steel fibers) having a pore size of about 4 microns is degassed under a nitrogen atmosphere at about 400° C. to remove any impurities. A carbon film layer is deposited on substantially all of the exposed surfaces of the substrate using the following procedure. The stainless steel substrate is heated to about 435° C. for about six hours while passing an about 88:12 (vol:vol) mixture of CO and hydrogen through the substrate at a total flow rate of about 500 cc/min. The carbon layer formed covers substantially all of the exposed surfaces of the substrate.

The deposition of the precursor metal species on the carbon-coated ceramic membrane is accomplished by solution impregnation. Sufficient sodium is dissolved in anhydrous liquid ammonia to form a dark blue colored solution (about 0.6 g sodium/100 ml liquid ammonia). The liquid ammonia solution of sodium is forced through the carbon-coated ceramic membrane using a positive pressure of nitrogen gas. The ammonia is then removed by heating the membrane to about 200° C. while purging with dry ultrapure nitrogen. The activation of the membrane to generate active sites which include sodium species in substantially deoxygenated form is then accomplished by heating the impregnated membrane for about 12 hours at a temperature of about 500° C. while purging the membrane with a dry 35:65 (vol:vol) mixture of hydrogen gas and ultrapure nitrogen gas.

EXAMPLE 6

Regeneration of a Reactive Membrane Including Sodium Species on Carbon-Coated Porous Alumina The steps of Example 1 are repeated except sodium hydroxide is used in place of lithium hydroxide. A nitrogen gas stream, which includes 2000 ppb water, is passed through the reactive membrane for 15 hours. The reactive membrane is then regenerated by heating the membrane for about 10 hours to from about 460° C. to about 475° C. while purging with a dry 35:65 mixture of hydrogen and ultrapure nitrogen gas. After regeneration the membrane shows water scavenging activity comparable to that achieved following the original activation process.

EXAMPLE 7

Regeneration of a Reactive Membrane Including Potassium Species on Carbon-Coated Porous Alumina A nitrogen gas stream, which includes 2000 ppb water, is passed through the reactive membrane prepared in Example 2 for 15 hours at room temperature. The reactive membrane is then regenerated by heating the membrane for about 28 hours at a temperature of about 500° C. while purging with a dry ultrapure argon gas. After regeneration the membrane shows water scavenging activity comparable to that achieved following the original activation process.

EXAMPLE 8–12

Removal of Impurities from a Nitrogen Gas Stream

The ability of reactive membranes prepared according to the procedure of Example 5 to remove impurities from a stream of inert gas is tested by passing a stream of ultrapure nitrogen gas, to which an impurity is added, through the membrane. During the test the membrane is maintained at about room temperature while the nitrogen gas containing the impurity is passed through the membrane for the time period indicated at a flow rate of about 800–1000 cc/min. The input and output concentration of the impurity is measured at intervals throughout the duration of the test. The results are shown below in Table I. In all of the experiments shown, a steady state output impurity concentration is achieved very rapidly and maintained throughout the duration of the test.

TABLE I

| Ex. No. | Impurity | Time (min) | Impurity Conc. (ppb) Input Conc. | Impurity Conc. (ppb) Output Conc. |
|---|---|---|---|---|
| 8 | $O_2$ | 200 | 10,000 | <0.1 |
| 9 | $H_2O$ | 200 | 1,020 | 0.6 |
| 10 | CO | 4600 | 350 | <0.7 |

TABLE I-continued

| Ex. No. | Impurity | Time (min) | Impurity Conc. (ppb) Input Conc. | Impurity Conc. (ppb) Output Conc. |
|---|---|---|---|---|
| 11 | $CH_4$ | 200 | 100 | <0.2 |
| 12 | $CO_2$ | 200 | 50 | 0.1 |

The results in Table I demonstrate that the reactive membranes of the present invention are highly effective for removing a variety of impurities from a gas.

In the specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for removing heterogeneous and homogeneous impurities from a gas comprising:

(a) passing the gas, which includes heterogenous and homogenous impurities, through a reactive membrane comprising a porous inorganic substrate and at least one carbon layer supported by the porous inorganic substrate, the carbon layer being modified to present active sites which include metal species chemically bonded to the carbon layer and serving as a scavanger; and (b) interacting the homogeneous impurities with the active sites, thereby removing the homogeneous impurities from the gas.

2. The method of claim 1 wherein interacting the impurities with the active sites includes reacting the homogeneous impurities with the active sites.

3. The method of claim 1 further comprising heating the membrane to greater than about 300° C. in an inert atmosphere, thereby regenerating the active sites.

4. The method of claim 1 further comprising heating the membrane to greater than about 300° C. in a reducing atmosphere, thereby regenerating the active sites.

5. The method of claim 4 wherein the reducing atmosphere is a hydrogen-containing atmosphere.

6. The method of claim 1 wherein the active sites include at least partially deoxygenated metal species chemically bonded to the carbon layer.

7. The method of claim 6 wherein the active sites include substantially deoxygenated metal species chemically bonded to the carbon layer.

8. The method of claim 1 comprising:

(a) passing an inert gas having a contaminant through a reactive membrane comprising porous stainless steel, wherein the active sites include sodium species chemically bonded to the carbon layer; and (b) interacting the contaminant with the active sites, thereby removing at least a portion of the contaminant from the inert gas.

9. The method of claim 8 wherein interacting the impurities with the active sites reduces the concentration of oxygen in the inert gas to no more than about 1 ppb.

10. The method of claim 8 wherein interacting the impurities with the active sites reduces the concentration of water in the inert gas to no more than about 1 ppb.

11. The method of claim 8 wherein the inert gas includes nitrogen, argon, or helium.

12. The method of claim 8 further comprising heating the membrane to greater than about 300° C. in nitrogen atmosphere, thereby regenerating the active sites.

13. The method of claim 1 comprising:
(a) passing reactive gas, which includes water as an impurity, through the reactive membrane which comprises a porous α-alumina membrane coated with a monolayer of γ-alumina, which includes from about 0.1 to about 1% of iron;
(b) interacting the water with the active sites, thereby removing at least a portion of the water from the reactive gas.

14. The method of claim 13 wherein the reactive gas comprises oxygen, hydrogen chloride or hydrogen bromide.

15. The method of claim 13 wherein the reactive gas comprises hydrogen chloride or hydrogen bromide and the active sites include sodium or magnesium species chemically bonded to the carbon layer.

16. The method of claim 13 further comprising heating the reactive membrane to greater than about 300° C. in an inert atmosphere, thereby regenerating the active sites.

17. The method of claim 1 wherein the step of passing the gas through a reactive membrane includes passing the gas through a porous inorganic substrate comprising sintered metal powder or metal fibers.

18. The method of claim 1 wherein the step of passing the gas through a reactive membrane includes passing the gas through a porous inorganic substrate formed from sintering stainless steel fibers.

19. The method of claim 18 wherein the porous inorganic substrate is formed from 316 L stainless steel and has a pore size of from 2 to 5 microns.

20. The method of claim 1 wherein the step of passing the gas through a reactive membrane includes passing the gas through a reactive membrane having at least one carbon layer in the form of a carbon film bound to the surfaces of the porous inorganic substrate.

21. The method of claim 1 wherein the step of passing the gas through a reactive membrane includes passing the gas through a reactive membrane with active sites including metal species chemically bonded to the carbon layer which comprise metal or metal suboxides chemisorbed on the carbon layer.

22. The method of claim 21 wherein the active sites on the at least one carbon layer include substantially deoxygenated metal species capable of reacting with trace impurities in the gas.

23. The method of claim 22 wherein the metal species is manganese, magnesium, or an alkali metal.

24. The method of claim 23 wherein the alkali metal is lithium, sodium, or potassium.

25. The method of claim 1 wherein the step of passing the gas through a reactive membrane includes passing the gas through a reactive membrane with active sites including metal species chemically bonded to the carbon layer which comprise at least one metal-carbon intercalate compound.

26. The method of claim 25 wherein the active sites on the at least one carbon layer include substantially deoxygenated metal species capable of reacting with trace impurities in the gas.

27. The method of claim 26 wherein the metal species is manganese, magnesium, or an alkali metal.

28. The method of claim 27 wherein the alkali metal is lithium, sodium, or potassium.

29. The method of claim 1 wherein the step of passing the gas through a reactive membrane includes passing the gas through a reactive membrane which comprise a plurality of metals deposited sequentially or as a mixture onto the at least one carbon layer.

30. The method of claim 1 wherein the step of passing the gas through a reactive membrane includes passing the gas through a reactive membrane which includes at least two layers of carbon deposited on the surfaces of the porous inorganic substrate, each of the at least two carbon layers including active sites.

31. The method of claim 30 wherein the active sites on each carbon layer may be the same or different.

32. The method of claim 1 wherein the step of interacting the homogeneous impurities with the active sites comprises interacting oxygen, water, carbon monoxide, carbon dioxide, or methane as an impurity.

33. The method of claim 32 wherein the step of interacting the homogeneous impurities with the active sites includes reducing the concentration of the impurities to no more than about 100 ppb.

34. The method of claim 33 wherein the step of interacting the homogeneous impurities with the active sites includes reducing the concentration of the impurities to no more than about 1 ppb.

35. The method of claim 32 wherein the step of interacting the homogeneous impurities with the active sites comprises interacting water or carbon monoxide as impurities and further includes reducing the concentration of water or carbon monoxide in the gas to no more than about 0.7 ppb.

36. The method of claim 32 wherein the step of passing gas through a reactive membrane comprises passing an inert gas through the membrane and wherein the step of interacting the homogeneous impurities with the active sites comprises interacting methane as an impurity and further includes reducing the concentration of methane in the inert gas to no more than about 0.2 ppb.

37. The method of claim 32 wherein the step of passing the gas through a reactive membrane comprises passing an inert gas through the membrane and wherein the step of interacting the homogeneous impurities with the active sites comprises interacting oxygen, carbon dioxide, or a mixture thereof as impurities and further includes reducing the concentration of oxygen, carbon monoxide, or mixture thereof to no more than about 0.1 ppb.

38. The method of claim 1 wherein the step of passing the gas through a reactive membrane comprises passing through the membrane a gas associated with an electronics manufacturing process.

39. The method of claim 38 wherein the step of interacting the homogeneous impurities with the active sites comprises interacting oxygen, water, carbon monoxide, carbon dioxide, or methane as impurities.

40. The method of claim 38 wherein the associated gas comprises a source stream including metal oxide impurities.

41. The method of claim 38 wherein the associated gas comprises an exhaust gas stream containing at least one heterogeneous or homogeneous impurity.

42. The method of claim 41 wherein the at least one impurity is a cyanide, a silane, arsenic, or mercury.

43. The method of claim 1 wherein the step of passing the gas through a reactive membrane comprises passing an inert gas through the membrane, the inert gas containing at least one impurity.

44. The method of claim 43 wherein the step of interacting the homogeneous impurities with the active sites comprises interacting oxygen, moisture, carbon dioxide, or a hydrocarbon as impurities.

45. The method of claim 1 wherein the step of passing the gas through a reactive membrane comprises passing a reactive gas through the membrane.

46. The method of claim 45 wherein the reactive gas comprises oxygen, a silane, hydrogen chloride, or hydrogen bromide, and wherein the step of interacting impurities with the active sites comprises interacting moisture contained in the reactive gas as an impurity.

47. The method of claim 46 wherein the reactive membrane includes active sites formed from sodium or magnesium species chemically bonded to the at least one carbon layer.

48. The method of claim 46 wherein the reactive gas is a silane, and wherein the step of interacting the impurities with the active sites comprises interacting oxygen present in the silane as an impurity.

49. The method of claim 3 wherein the step of heating the membrane in an inert atmosphere comprises heating the membrane to a temperature of from about 450° C. to about 550° C.

50. The method of claim 5 wherein the step of heating the membrane in a reducing atmosphere comprises heating the membrane to a temperature greater than about 500° C. and maintaining the membrane at that temperature for about one hour while purging the membrane with a mixture of oxygen and an inert gas.

51. The method of claim 1 wherein the step of passing the gas through a reactive membrane comprises passing the gas through a reactive membrane comprising a stainless steel substrate formed by sintering 316 L stainless steel fibers of about 2 microns in size and having a pore size of about 4 microns, a carbon film layer deposited on surfaces of the substrate, and active sites in the carbon film layer which include sodium metal species.

52. The method of claim 51 wherein the gas passing through the reactive membrane comprises an inert gas.

53. The method of claim 52 wherein the inert gas passing through the reactive membrane is nitrogen containing oxygen, moisture, carbon monoxide, carbon dioxide, or methane as impurities.

54. The method of claim 8, wherein the contaminant is selected from the group consisting of oxygen, water and mixtures thereof.

55. A method for removing homogeneous or a combination of homogeneous and heterogeneous impurities from a gas comprising:

(a) passing gas containing at least one homogeneous impurity or a combination of homogeneous and heterogeneous impurities through a reactive membrane which comprises a porous inorganic substrate and a carbon layer supported by substantially all of the porous inorganic substrate, the carbon layer being modified to present active sites which include metal species chemically bonded to the carbon layer and serving as a scavenger;

(b) filtering at least a portion of any heterogeneous impurities from the gas; and (c) interacting at least a portion of the homogeneous impurities with the active sites, thereby removing said portion of homogeneous impurities from the gas.

56. The method of claim 55 wherein the step of passing the gas through a reactive membrane includes passing the gas through a porous inorganic substrate comprising sintered metal powder or metal fibers.

57. The method of claim 56 wherein the porous inorganic substrate includes stainless steel formed from sintering stainless steel fibers.

58. The method of claim 56 wherein the porous inorganic substrate is formed from 316 L stainless steel and has a pore size of from 2 to 5 microns.

* * * * *